United States Patent
Smyth et al.

(10) Patent No.: US 10,544,063 B2
(45) Date of Patent: Jan. 28, 2020

(54) METHOD OF FABRICATING A CERAMIC MATRIX COMPOSITE

(71) Applicant: United Technologies Corporation, Farmington, CT (US)

(72) Inventors: Imelda P. Smyth, North Palm Beach, FL (US); R. Wesley Jackson, West Hartford, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 15/705,622

(22) Filed: Sep. 15, 2017

(65) Prior Publication Data

US 2019/0084889 A1  Mar. 21, 2019

(51) Int. Cl.
*C04B 35/80* (2006.01)
*C04B 35/628* (2006.01)
(Continued)

(52) U.S. Cl.
CPC ...... *C04B 35/806* (2013.01); *C04B 35/62863* (2013.01); *C04B 35/62871* (2013.01); *C04B 35/62884* (2013.01); *C04B 41/009* (2013.01); *C04B 41/5059* (2013.01); *C04B 41/5066* (2013.01); *C04B 41/87* (2013.01);
(Continued)

(58) Field of Classification Search
CPC ............ C04B 35/806; C04B 35/62863; C04B 35/62871; C04B 35/62884
See application file for complete search history.

(56) References Cited

U.S. PATENT DOCUMENTS 6,562,409 B2  5/2003  Koshkarian et al.
6,689,422 B1  2/2004  Warnes et al.
(Continued)

FOREIGN PATENT DOCUMENTS

WO   2014150777      9/2014
WO   WO 2014/149757  * 9/2014

OTHER PUBLICATIONS

Zok, Frank W., "Ceramic-matrix composites enable revolutionary gains in turbine engine efficiency". American Ceramic Society Bulletin, vol. 95, No. 5, pp. 22-28, no date available.*
(Continued)

*Primary Examiner* — Bret P Chen
(74) *Attorney, Agent, or Firm* — Carlson, Gaskey & Olds, P.C.

(57) ABSTRACT

A method of fabricating a ceramic matrix composite includes generating a stream of vaporized precursor and, optionally, a vaporized rare earth element. The vaporized precursor is a precursor of either silicon carbide or silicon nitride. The stream flows for one or more periods of time through a chamber that contains a fibrous structure such that the fibrous structure is exposed to the stream. The fibrous structure initially contains no silicon carbide matrix or silicon nitride matrix. The vaporized precursor deposits over the period of time on the fibrous structure as a substantially fully dense ceramic matrix of either the silicon carbide or the silicon nitride. For at least a portion of the period of time, the vaporized rare earth element is included in the stream such that the ceramic matrix deposited during that time includes dispersed rare earth element.

20 Claims, 1 Drawing Sheet

(51) Int. Cl.
*C04B 41/00* (2006.01)
*C04B 41/50* (2006.01)
*C04B 41/87* (2006.01)

(52) U.S. Cl.
CPC .............. *C04B 2235/3826* (2013.01); *C04B 2235/3873* (2013.01); *C04B 2235/5244* (2013.01); *C04B 2235/614* (2013.01)

(56) References Cited

U.S. PATENT DOCUMENTS

| | | |
|---|---|---|
| 9,512,044 B2 | 12/2016 | Lazur et al. |
| 9,650,303 B2 | 5/2017 | Chamberlain et al. |
| 9,676,674 B2 | 6/2017 | Lazur |
| 2011/0027559 A1* | 2/2011 | Kirby .................. C04B 35/16 428/215 |
| 2014/0273681 A1 | 9/2014 | Chamerblain et al. |
| 2016/0159702 A1 | 6/2016 | Lazur |

OTHER PUBLICATIONS

Poerschke, David L., et al., "Yttrium Bearing Silicon Carbide Matrices for Robust Ceramic Composites". J. Am. Ceram. Soc., 96 [4] 1300-1308 (2013).*
Prewo, K.M., et al., "Silicon carbide yarn reinforced glass matrix composites". Journal of Materials Science 17 (1982) 1201-1206.*
Singh, M., et al., "Low Cost Fabrication of Silicon Carbide Based Ceramics and Fiber Reinforced Composites". NASA Technical Memorandum 107001 for Technology 2004, Washington DC, Nov. 8-10, 1994, pp. 1-14.*
Partial European Search Report for European Patent Application No. 18194604.7 completed Feb. 18, 2019.

\* cited by examiner

METHOD OF FABRICATING A CERAMIC MATRIX COMPOSITE

BACKGROUND

Ceramic matrix composites ("CMCs") include fibers that are embedded in a ceramic matrix. In gas turbine engines and the like, example fibers of interest include silicon carbide or carbon fibers, and example matrices of interest may be silicon carbide or silicon nitride. Such ceramic matrix composites exhibit good strength and chemical properties. At high temperatures the composite can form a protective passive oxide layer. The oxide layer may, however, be subject to volatilization at high temperatures in the presence of moisture. An environmental barrier coating may be used to limit moisture exposure.

SUMMARY

A method of fabricating a ceramic matrix composite according to an example of the present disclosure includes generating a stream of vaporized precursor and, optionally, a vaporized rare earth element. The vaporized precursor is a precursor of either silicon carbide or silicon nitride flowing the stream for one or more periods of time through a chamber that contains a fibrous structure such that the fibrous structure is exposed to the stream. The fibrous structure initially contains no silicon carbide matrix or silicon nitride matrix. The vaporized precursor is deposited over the one or more periods of time on the fibrous structure as a substantially fully dense ceramic matrix of either the silicon carbide or the silicon nitride. For at least a portion of the one or more periods of time, the vaporized rare earth element is included in the stream such that the ceramic matrix deposited during the portion of the one or more periods of time includes dispersed rare earth element.

In a further embodiment of any of the foregoing embodiments, the precursor is of the silicon carbide.

In a further embodiment of any of the foregoing embodiments, in an initial portion of the one or more periods of time, the stream excludes the vaporized rare earth element.

In a further embodiment of any of the foregoing embodiments, in a final portion of the one or more periods of time, the stream includes the vaporized rare earth element.

In a further embodiment of any of the foregoing embodiments, the rare earth element is selected from the group consisting of yttrium, lutetium, ytterbium, erbium, and combinations thereof.

In a further embodiment of any of the foregoing embodiments, the rare earth element is selected from the group consisting of yttrium, lutetium, and combinations thereof.

In a further embodiment of any of the foregoing embodiments, the rare earth element is selected from the group consisting of ytterbium, erbium, and combinations thereof.

In a further embodiment of any of the foregoing embodiments, the ceramic matrix that is deposited during the portion of the one or more periods of time in which the vaporized rare earth element is included, includes up to 5 atomic % of the dispersed rare earth element.

In a further embodiment of any of the foregoing embodiments, the rare earth element is selected from the group consisting of yttrium, lutetium, ytterbium, erbium, and combinations thereof.

In a further embodiment of any of the foregoing embodiments, the vaporized rare earth element that is included in the stream for at least the portion of the one or more periods of time includes two rare earth elements.

In a further embodiment of any of the foregoing embodiments, the two rare earth elements are selected from the group consisting of yttrium, lutetium, ytterbium, and erbium.

A method of fabricating a ceramic matrix composite according to an example of the present disclosure includes generating a stream of vaporized precursor and a vaporized rare earth element. The vaporized precursor is a precursor of either silicon carbide or silicon nitride. The stream flows through a chamber that contains a substantially fully densified ceramic matrix composite such that the ceramic matrix composite is exposed to the stream. The vaporized precursor and vaporized rare earth element are deposited on the ceramic matrix composite as a substantially fully dense ceramic coating of either the silicon carbide or the silicon nitride with dispersed rare earth element.

In a further embodiment of any of the foregoing embodiments, the precursor is of the silicon carbide.

In a further embodiment of any of the foregoing embodiments, the rare earth element is selected from the group consisting of yttrium, lutetium, ytterbium, erbium, and combinations thereof.

In a further embodiment of any of the foregoing embodiments, the rare earth element is selected from the group consisting of yttrium, lutetium, and combinations thereof.

In a further embodiment of any of the foregoing embodiments, the rare earth element is selected from the group consisting of ytterbium, erbium, and combinations thereof.

In a further embodiment of any of the foregoing embodiments, the ceramic coating includes up to 5 atomic % of the dispersed rare earth element.

In a further embodiment of any of the foregoing embodiments, the vaporized rare earth element includes two rare earth elements.

In a further embodiment of any of the foregoing embodiments, the two rare earth elements are selected from the group consisting of yttrium, lutetium, ytterbium, and erbium.

A ceramic matrix composite according to an example of the present disclosure includes a substantially fully densified ceramic matrix and a fibrous structure embedded in the ceramic matrix, and at least one ceramic layer of, exclusively, either silicon carbide or silicon nitride, with dispersed rare earth element.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
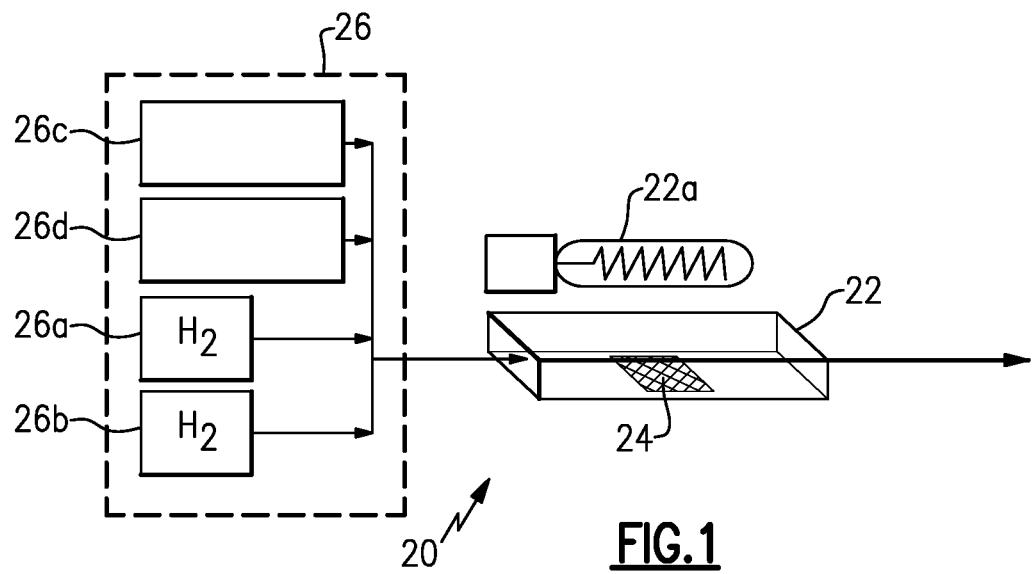
FIG. 1 illustrates an example system for conducting a method of fabricating a ceramic matrix composite ("CMC").

FIG. 1 schematically illustrates a system 20 for conducting a method of fabricating a ceramic matrix composite ("CMC"). As will be described, the method provides for fabrication of a ceramic matrix, a ceramic coating, or both, that has dispersed rare earth element. Rare earth elements include cerium, dysprosium, erbium, europium, gadolinium, holmium, lanthanum, lutetium, neodymium, praseodymium, promethium, samarium, scandium, terbium, thulium, ytterbium, and yttrium. Of these, dysprosium, erbium, holmium, lutetium, scandium, thulium, yttrium, and combinations of these elements may be better suited for high temperature uses because they have melting temperatures that are above 1400° C.

Ceramics such as silicon carbide and silicon nitride may be used in gas turbine engine components (e.g., turbine airfoils, air seals, combustor liners, etc.). Silicon carbide and silicon nitride may be subject to environmental attack due to moisture, oxygen, and heat. The addition of one or more rare earth elements in small amounts can serve to enhance environmental resistance. The rare earth elements may react with oxygen to form silicate phases that serve as a barrier to further infiltration of oxygen and moisture. The method provides a process for fabricating such ceramic materials with rare earth elements selectively dispersed therein.

The system 20 generally includes a chamber 22 in which a fibrous structure 24 can be processed to form a ceramic matrix composite. The chamber 22 may generally be sealed with the exception of an inlet at one end and an outlet at an opposite end. A vacuum pump may be connected to the chamber to control the chamber pressure. An external heating source 22a may be connected to the chamber to control the chamber temperature. The fibrous structure 24 may be placed or mounted in a known manner between the inlet and the outlet so as to be exposed to flow through the chamber 22 from the inlet to the outlet. The inlet is fluidly connected or connectable with one or more gas or precursor sources 26. Although not shown, the system 20 may also include valves for controlling flow from the sources 26.

For example, the sources 26 may include one or more process gases 26a/26b, such as hydrogen and/or nitrogen, and one or more precursors 26c/26d. The precursor 26c is a precursor of either silicon carbide or silicon nitride, and the precursor 26d is a precursor of one or more rare earth elements. The process gases may be used to carry the precursors 26c/26d.

One example precursor of silicon carbide is polysilane, such as methyltricholorosilane, but other carbosilanes may also be used. Silicon carbide may also be formed from two precursors such as Silane, $SiH_4$, and propane $C_3H_8$. One example precursor of silicon nitride is polysilazane, such as dichlorosilazane, but other polysilzanes may also be used. The precursor 26d for the rare earth element may be a chloride gas of the selected element or elements. At least the silanes or siloxanes may initially be in liquid form. The liquid may be appropriately heated to vaporize the precursor.

In that regard, the method includes generating a stream of vaporized precursor 26c. The stream of the vaporized precursor 26c is fed into the chamber 22 via one or more of the process gases 26a/26b. Optionally, the precursor 26d of the rare earth element is also vaporized and fed into the chamber 22 to co-deposit with the ceramic. If the precursor 26d is not already a gas, it may also be vaporized by heating. In further examples, the precursor 26d may be combined and mixed with the precursor 26c. The precursor 26d may be formed by flowing $H_2/Cl_2$ gas mixtures in a chamber containing pieces of rare earth metal. By controlling the $H_2/Cl_2$ gas ratio, the temperature of the chamber, and the surface area of the rare earth metal, the amount of rare earth chloride precursor can be controlled.

The stream of the vaporized precursor 26c is fed for one or more periods of time through the chamber 22. The fibrous structure 24 is exposed to the flow of the stream of vaporized precursor 26b in the chamber 22. The chamber 22 may be heated using the heater 22a to maintain the precursor 26b in the vaporized state. The vaporized precursor 26b infiltrates the fibrous structure 24 and deposits the ceramic, either silicon carbide or silicon nitride, thereon.

Figure 2:
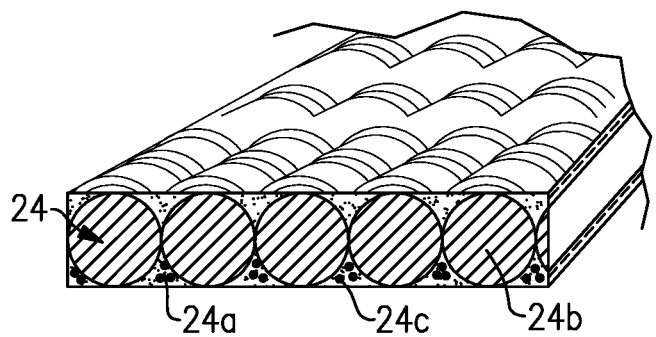
FIG. 2 illustrates an example ceramic matrix composite with dispersed rare earth element.

A representative example of the fibrous structure 24 and deposited matrix 24a are shown in FIG. 2. For instance, the fibrous structure 24 may be formed of fibers 24b, such as but not limited to, silicon carbide fibers. The fibers 24b may have one or more interface coatings (not shown), such as but not limited to carbon or boron nitride. However, at least initially, prior to the start of deposition of the matrix 24a, the fiber structure 24 contains no silicon carbide matrix or silicon nitride matrix.

The rate of deposition may be rather slow and the fibrous structure 24 may thus be exposed to the stream for several hours up to one-hundred or more hours as necessary to fully deposit the entire matrix 24a. In this regard, the matrix 24a may be entirely silicon carbide or silicon nitride, but for the rare earth element discussed further below. Alternatively, the matrix 24a may be deposited in discrete iterations in which the matrix 24a is deposited for a period of time, followed by stopping deposition (e.g., for cooling or partial cooling), followed by deposition for another period of time. The deposited matrix 24a is substantially fully dense. For instance, the matrix is greater than 90% dense, greater than 95% dense, or greater than 99% dense.

For at least a portion of the one or more periods of time, the rare earth element is also deposited. For instance, the vaporized rare earth element 26d is included in the stream along with the vaporized precursor 26c such that the matrix 24a deposited during the portion of the one or more periods of time includes dispersed rare earth element 24c. Thus, the rare earth element 24c need not be included in the stream for the entire process. Rather, the rare earth element can be selectively included such that only a portion or portions of the matrix 24a contain the rare earth element 24c. This may reduce the amount of rare earth element used, but also enables the rare earth element 24c to be deposited only in locations where it may have greater effect.

At least a portion of the rare earth element may deposit in metallic form. In some examples, however, at least a portion of the rare earth element may react with the precursor 26c, specifically silicon in the precursor 26c. In this case, at least a portion of the rare earth metal may deposit in the form of a silicide compound, such as such as $Y_5Si_3$, YSi, $YSi_2$, $Y_5Si_3C$, $Yb_5Si_3$, YbS, $YbSi_2$, or $Lu_5Si_3$, $Lu_5Si_4$, $LuSi_2$, or $Lu_5Si_3C$. Thus, as used herein, deposition of rare earth element in the matrix 24a may refer to metallic rare earth element (unbonded to other, different elements), the rare earth element in a compound, such as a silicide, or a mixture of metallic rare earth element and rare earth element in a compound.

For example, the rare earth element 24c may have a greater effect when located toward the outside of the overall composite, to capture oxygen and moisture early on in infiltration into the composite. In this regard, in the deposition process, an initial portion of the deposition time excludes the vaporized rare earth element. Thus, at least initially, only the silicon carbide or the silicon nitride is deposited. Later, after deposition of this pure silicon carbide or silicon nitride, the vaporized rare earth element is included. For instance, a final portion of the deposition time includes the vaporized rare earth element such that the outermost region of the matrix 24a includes the rare earth element 24c.

In further examples, although all or nearly all of the rare earth elements are expected to form glass or silicate, there are several rare earth elements that may be preferred. For instance, the rare earth element 24c includes yttrium, lutetium, ytterbium, erbium, or combinations thereof. In some examples, two or more rare earth elements are used. For example, the rare earth elements are any two of yttrium, lutetium, ytterbium, and erbium. In one further example, the two elements are two of lutetium, ytterbium, and erbium.

Additionally, only small amounts of the rare earth element 24c are needed to assist with capture of oxygen and moisture prior to infiltration into the composite. For instance, the matrix 24a includes up to 5 atomic % of the rare earth element 24c. Above about 5 atomic %, there may be increased chance of changing other properties, such as the coefficient of thermal expansion. In further examples, the amount is from 0.5 atomic % to 4 atomic %, and in further examples the amount is from 1 atomic % to 3.5 atomic % or from 1.5 atomic % to 3 atomic %.

Figure 3:
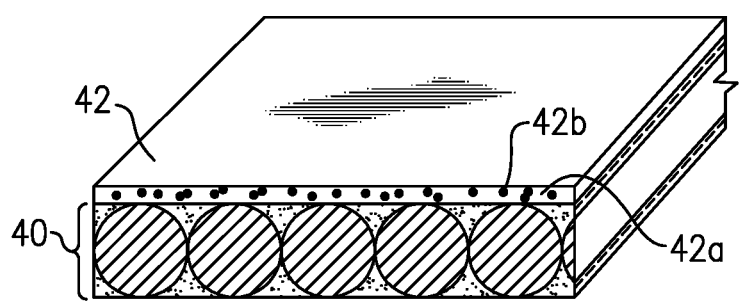
FIG. 3 illustrates an example ceramic matrix composite with a protective coating that has dispersed rare earth element.

Additionally or alternatively, the system 20 may also be used to provide a ceramic coating with the dispersed rare earth element as a protective outer coating on an already-formed ceramic matrix composite. FIG. 3 illustrates a ceramic matrix composite 40, which may be a ceramic matrix composite formed as discussed above. The system 20 can be used to deposit a protective coating layer 42 on the outside of the composite 40. The layer 42 is formed of the ceramic 42a, which is either silicon carbide or silicon nitride, and rare earth element 42b dispersed there through. The coating 42 deposits on the ceramic matrix composite 40 as a substantially fully dense ceramic coating. The rare earth element 42b is well dispersed, which enhances capture of oxygen and moisture prior to infiltration into the composite 40.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method of fabricating a ceramic matrix composite, the method comprising:
    generating a stream of vaporized precursor, wherein the vaporized precursor is a precursor of either silicon carbide or silicon nitride;
    flowing the stream for one or more periods of time through a chamber that contains a fibrous structure such that the fibrous structure is exposed to the stream, wherein the fibrous structure initially contains no silicon carbide matrix or silicon nitride matrix, the vaporized precursor depositing over the one or more periods of time on the fibrous structure as a substantially fully dense ceramic matrix of either the silicon carbide or the silicon nitride; and
    for at least a portion of the one or more periods of time, including a vaporized rare earth element in the stream such that the ceramic matrix deposited during the portion of the one or more periods of time includes dispersed rare earth element, wherein in an initial portion of the one or more periods of time, the stream excludes the vaporized rare earth element.

2. The method as recited in claim 1, wherein the precursor is of the silicon carbide.

3. The method as recited in claim 1, wherein in a final portion of the one or more periods of time, the stream includes the vaporized rare earth element.

4. The method as recited in claim 1, wherein the rare earth element is selected from the group consisting of yttrium, lutetium, ytterbium, erbium, and combinations thereof.

5. The method as recited in claim 4, wherein the rare earth element is selected from the group consisting of yttrium, lutetium, and combinations thereof.

6. The method as recited in claim 4, wherein the rare earth element is selected from the group consisting of ytterbium, erbium, and combinations thereof.

7. The method as recited in claim 1, wherein the ceramic matrix that is deposited during the portion of the one or more periods of time in which the vaporized rare earth element is included, includes up to 5 atomic % of the dispersed rare earth element.

8. The method as recited in claim 7, wherein the rare earth element is selected from the group consisting of yttrium, lutetium, ytterbium, erbium, and combinations thereof.

9. The method as recited in claim 1, wherein the vaporized rare earth element that is included in the stream for at least the portion of the one or more periods of time includes two rare earth elements.

10. The method as recited in claim 9, wherein the two rare earth elements are selected from the group consisting of yttrium, lutetium, ytterbium, and erbium.

11. The method as recited in claim 1, wherein the vaporized rare earth element is a rare earth chloride.

12. A method of fabricating a ceramic matrix composite, the method comprising:
    generating a stream of vaporized precursor and a vaporized rare earth element, wherein the vaporized precursor is a precursor of either silicon carbide or silicon nitride;
    flowing the stream through a chamber that contains a substantially fully densified ceramic matrix composite such that the ceramic matrix composite is exposed to the stream, the vaporized precursor and vaporized rare earth element depositing on the ceramic matrix composite as a substantially fully dense ceramic coating of either the silicon carbide or the silicon nitride with dispersed rare earth element; and
    during a period of the generating of the stream of vaporized precursor, excluding the vaporized rare earth element, the vaporized precursor depositing on the ceramic matrix composite as a substantially fully dense ceramic coating of either the silicon carbide or the silicon nitride without a dispersed rare earth element.

13. The method as recited in claim 12, wherein the precursor is of the silicon carbide.

14. The method as recited in claim 12, wherein the rare earth element is selected from the group consisting of yttrium, lutetium, ytterbium, erbium, and combinations thereof.

15. The method as recited in claim 14, wherein the rare earth element is selected from the group consisting of yttrium, lutetium, and combinations thereof.

16. The method as recited in claim 14, wherein the rare earth element is selected from the group consisting of ytterbium, erbium, and combinations thereof.

17. The method as recited in claim 12, wherein the ceramic coating includes up to 5 atomic % of the dispersed rare earth element.

18. The method as recited in claim 12, wherein the vaporized rare earth element includes two rare earth elements.

19. The method as recited in claim 18, wherein the two rare earth elements are selected from the group consisting of yttrium, lutetium, ytterbium, and erbium.

20. The method as recited in claim 12, wherein the vaporized rare earth element is a rare earth chloride.

* * * * *